(12) United States Patent
Vora et al.

(10) Patent No.: US 11,618,192 B2
(45) Date of Patent: Apr. 4, 2023

(54) INJECTION MOLDING METHOD AND MOLD

(71) Applicant: Acushnet Company, Fairhaven, MA (US)

(72) Inventors: Ajay Vora, Foxboro, MA (US); John M. Thornton, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 309 days.

(21) Appl. No.: 16/712,927

(22) Filed: Dec. 12, 2019

(65) Prior Publication Data

US 2021/0178646 A1   Jun. 17, 2021

(51) Int. Cl.
*B29C 45/14* (2006.01)
*B29C 45/27* (2006.01)
*B29L 31/54* (2006.01)

(52) U.S. Cl.
CPC .. *B29C 45/14819* (2013.01); *B29C 45/14073* (2013.01); *B29C 45/2708* (2013.01); *B29C 2045/14942* (2013.01); *B29L 2031/546* (2013.01)

(58) Field of Classification Search
CPC ........ B29C 45/14819; B29C 45/14073; B29C 45/2708; B29C 2045/14942; B29L 2031/546
See application file for complete search history.

(56) References Cited

U.S. PATENT DOCUMENTS

| | | | |
|---|---|---|---|
| 3,909,175 A * | 9/1975 | Gemmill | B29C 45/2701 425/542 |
| 4,959,000 A | 9/1990 | Giza | |
| 5,147,657 A | 9/1992 | Giza | |
| 5,484,870 A | 1/1996 | Wu | |
| 5,596,251 A | 1/1997 | Miller | |
| 5,688,193 A | 11/1997 | Kasasima et al. | |
| 5,798,071 A | 8/1998 | Boehm | |
| 5,824,258 A | 10/1998 | Yamaguchi | |
| 5,827,466 A * | 10/1998 | Yamaguchi | B29C 45/2708 264/279.1 |
| 5,827,548 A | 10/1998 | Lavallee et al. | |
| 5,827,567 A | 10/1998 | Molitor | |
| 5,840,351 A | 11/1998 | Inoue et al. | |
| 5,874,038 A | 2/1999 | Kasashima et al. | |
| 5,879,599 A | 3/1999 | Inoue et al. | |
| 5,902,193 A | 5/1999 | Shimosaka et al. | |
| 5,906,551 A | 5/1999 | Kasashima et al. | |
| 5,935,500 A | 8/1999 | Stanton et al. | |
| 5,947,844 A | 9/1999 | Shimosaka et al. | |
| 5,975,869 A | 11/1999 | Shimosaka et al. | |
| 6,024,551 A | 2/2000 | Yamaguchi | |
| 6,033,611 A | 3/2000 | Yamaguchi | |
| 6,050,803 A | 4/2000 | Omura et al. | |

(Continued)

*Primary Examiner* — Jacob T Minskey
*Assistant Examiner* — Caroline Beha
(74) *Attorney, Agent, or Firm* — Steven Landolfi, Jr.

(57) ABSTRACT

Improved injection molding methods and molds, for forming TPU layers, especially thin TPU covers, into golf ball constructions, and having improved number, shape and placement of both the injection gates and the cold slugs within the mold in order to minimize/eliminate damage to dimples strategically positioned close to the parting line of a mold in order to maximize aerodynamic properties of the resulting golf ball.

11 Claims, 5 Drawing Sheets

(56) References Cited

U.S. PATENT DOCUMENTS

| | | |
|---|---|---|
| 6,089,847 A | 7/2000 | Inoue et al. |
| 6,093,360 A | 7/2000 | Inoue et al. |
| 6,123,534 A * | 9/2000 | Kasashima ....... B29C 45/14819 |
| | | 264/279.1 |
| 6,129,881 A | 10/2000 | Puniello |
| 6,168,407 B1 | 1/2001 | Kasashima et al. |
| 6,207,784 B1 | 3/2001 | Rajagopalan |
| 6,218,453 B1 | 4/2001 | Boehm et al. |
| 6,235,230 B1 | 5/2001 | Puniello |
| 6,379,138 B1 | 4/2002 | Puniello et al. |
| 6,422,850 B1 | 7/2002 | Shannon et al. |
| 6,436,327 B1 | 8/2002 | Cloutier et al. |
| 6,447,406 B1 | 9/2002 | Kato |
| 6,517,451 B2 | 2/2003 | Carvallaro et al. |
| 6,524,419 B1 | 2/2003 | Dabrowski, Jr. et al. |
| 6,562,912 B1 | 5/2003 | Sullivan et al. |
| 6,659,886 B1 | 12/2003 | Yamagishi et al. |
| 6,685,456 B2 | 2/2004 | Sajima |
| 6,776,942 B2 | 8/2004 | Kim |
| 6,787,091 B2 | 9/2004 | Dalton et al. |
| 6,817,852 B2 | 11/2004 | Lavallee |
| 6,817,853 B2 | 11/2004 | Simonds et al. |
| 6,877,974 B2 | 4/2005 | Puniello et al. |
| 6,893,359 B2 | 5/2005 | Shimosaka |
| 6,913,726 B2 | 7/2005 | Brum |
| 6,936,205 B2 | 8/2005 | Cavallaro et al. |
| 7,135,138 B2 | 11/2006 | Puniello et al. |
| 7,150,618 B2 | 12/2006 | Sajima et al. |
| 7,204,946 B2 | 4/2007 | Moore |
| 7,223,085 B2 | 5/2007 | Puniello et al. |
| 7,252,488 B2 | 8/2007 | Nakai |
| 7,347,964 B2 | 3/2008 | Bergin et al. |
| 7,381,041 B2 | 6/2008 | Wilber |
| 7,547,258 B2 | 6/2009 | Kasashima et al. |
| 7,632,449 B2 | 12/2009 | Wachi |
| 7,648,667 B2 | 1/2010 | Brum |
| 7,704,431 B2 | 4/2010 | Endo et al. |
| 7,718,107 B2 | 5/2010 | Endo et al. |
| 7,842,220 B2 | 11/2010 | Hinomoto et al. |
| 7,927,524 B2 | 4/2011 | Vora et al. |
| 8,083,977 B2 | 12/2011 | Nakagawa et al. |
| 8,267,809 B2 | 9/2012 | Nakagawa et al. |
| 8,309,002 B2 | 11/2012 | Vora et al. |
| 8,408,891 B2 | 4/2013 | Nakagawa et al. |
| 8,512,619 B2 | 8/2013 | Tutmark |
| 8,662,882 B2 | 3/2014 | Wang |
| 8,714,956 B2 | 5/2014 | Madson et al. |
| 8,980,151 B2 | 3/2015 | Chou et al. |
| 9,108,347 B2 | 8/2015 | Nakagawa et al. |
| 9,211,662 B2 | 12/2015 | Kennedy, III et al. |
| 10,046,210 B1 | 8/2018 | Vora et al. |
| 10,427,334 B1 | 10/2019 | Strozyk et al. |
| 2002/0016435 A1 | 2/2002 | Simonutti et al. |
| 2002/0086074 A1 | 7/2002 | Lavallee |
| 2003/0067088 A1 | 4/2003 | Scolamiero et al. |
| 2003/0100386 A1 | 5/2003 | Jordan |
| 2003/0139228 A1 | 7/2003 | Cavallaro et al. |
| 2003/0153402 A1 | 8/2003 | Simonds et al. |
| 2004/0048687 A1 | 3/2004 | Jordan |
| 2004/0072629 A1 | 4/2004 | Keller et al. |
| 2004/0080080 A1 | 4/2004 | Dalton et al. |
| 2004/0157681 A1 | 8/2004 | Lemons et al. |
| 2005/0037866 A1 | 2/2005 | Emerson et al. |
| 2005/0159247 A1 | 7/2005 | Lemons et al. |
| 2005/0244530 A1 * | 11/2005 | Puniello ............ A63B 37/0075 |
| | | 425/116 |
| 2006/0073913 A1 | 4/2006 | Castner |
| 2006/0093702 A1 * | 5/2006 | Andersen ........... B29C 45/2602 |
| | | 425/556 |
| 2006/0111543 A1 | 5/2006 | Dewanjee |
| 2007/0035063 A1 | 2/2007 | Lavallee et al. |
| 2009/0297653 A1 | 12/2009 | Lavallee et al. |
| 2010/0087227 A1 | 4/2010 | Ogg et al. |
| 2010/0087274 A1 | 4/2010 | Ogg et al. |
| 2010/0197428 A1 * | 8/2010 | Aoyama ............ A63B 37/0004 |
| | | 473/379 |
| 2011/0130217 A1 | 6/2011 | Ogg et al. |
| 2012/0077620 A1 | 3/2012 | Ogg et al. |
| 2013/0072323 A1 | 3/2013 | Lin |
| 2013/0140734 A1 | 6/2013 | Chou et al. |
| 2013/0172105 A1 | 7/2013 | Ishii et al. |
| 2014/0054819 A1 | 2/2014 | Lin |
| 2014/0077414 A1 | 3/2014 | Kim et al. |
| 2014/0367884 A1 | 12/2014 | Iizuka et al. |
| 2015/0367179 A1 | 12/2015 | Farrell et al. |
| 2015/0367180 A1 | 12/2015 | Farrell et al. |
| 2015/0367181 A1 | 12/2015 | Farrell et al. |
| 2016/0346972 A1 | 12/2016 | Binette |
| 2017/0320152 A1 | 11/2017 | Hampton et al. |
| 2020/0039125 A1 * | 2/2020 | Kotaka ............... B29C 45/0025 |
| 2020/0245840 A1 * | 8/2020 | Haegermarck ..... A47L 15/4221 |

\* cited by examiner

INJECTION MOLDING METHOD AND MOLD

FIELD OF THE INVENTION

Methods and molds for improving retractable pin injection molding ("RPIM") of golf ball layers such thin thermoplastic polyurethane ("TPU") cover layers about subassemblies, and the resulting improved golf balls.

BACKGROUND OF THE INVENTION

Conventional golf balls can be divided into two general classes: solid and wound. Solid golf balls include one-piece, two-piece (i.e., single layer core and single layer cover), and multi-layer (i.e., solid core of one or more layers and/or a cover of one or more layers) golf balls. Wound golf balls typically include a solid, hollow, or fluid-filled center, surrounded by a tensioned elastomeric material, and a cover.

Examples of golf ball materials range from rubber materials, such as balata, styrene butadiene, polybutadiene, or polyisoprene, to thermoplastic or thermoset resins such as polyurethanes, polyureas and/or polyurethane/polyurea hybrids, ionomers, polyolefins, polyamides, polyesters, and blends thereof.

From the perspective of a golf ball manufacturer, it is desirable to have materials exhibiting a wide range of properties, such as resilience, durability, spin, and "feel," because this enables the manufacturer to make and sell golf balls suited to differing levels of ability and/or preferences. Playing characteristics of golf balls, such as spin, feel, CoR and compression can be tailored by varying the properties of the golf ball materials and/or adding additional golf ball layers such as at least one intermediate layer disposed between the cover and the core. Intermediate layers can be of solid construction, and have also been formed of a tensioned elastomeric winding. The difference in play characteristics resulting from these different types of constructions can be quite significant.

In recent years, golf ball manufacturers have selected polyurethane compositions as cover materials because of the relatively soft golf ball feel that can be produced without sacrificing toughness and durability. Generally, polyurethane compositions contain urethane linkages formed by reacting an isocyanate group (—N=C=O) with a hydroxyl group (OH). Polyurethanes are produced by the reaction of a multi-functional isocyanate with a polyol in the presence of a catalyst and other additives. The chain length of the polyurethane prepolymer is extended by reacting it with hydroxyl-terminated and amine curing agents. Depending on the type of curing agent used, the polyurethane composition may be thermoplastic or thermoset in nature.

Thermoplastic polyurethanes (TPU) are desirable because they have good processability, possess good melt-flow properties, and create bonds that can be softened and reversibly broken by increasing temperature during molding or extrusion and then returned to original condition when cooled. Minimal crosslinking results in thermoplastic polyurethane materials primarily from hydrogen bonding or other physical mechanism in the polymer network. In contrast, thermoset polyurethanes generally have a high level of cross-linking and form bonds that become irreversibly set once the thermoset polyurethane is cured, and are therefore often more rigid than thermoplastic polyurethanes, which in contrast tend to be more flexible. Due to this distinction, TPU materials remain popular cover materials.

Multiple conventional molding methods have been used to form a cover layer of TPU material about a core/subassembly. Common conventional methods/processes for molding thermoplastic cover layers about a core or other subassembly include injection-molding, compression molding, and/or casting.

In an injection molding process, such as retractable pin injection molding (RPIM), the TPU cover material is injected into a dimpled cavity mold and formed about inner layers. Unfortunately, in conventional systems, difficulties can arise when trying to optimize placement of injection gates without meanwhile damaging dimples that are placed close to the parting line when trying to maximize the aerodynamic properties of the resulting golf ball. For example, dimples at the parting line can be damaged from injection gates clipping or extending into dimples when separating the mold cavities after molding or when wide buffing is required to clean the gates. These problems, along with conventional cold slug shape and placement within the mold, limit placement, spacing and number of injection gates used at the parting line in the mold.

Accordingly, a need remains for new golf ball manufacturing injection molding methods and molds that address and eliminate these problems by providing improved gate shape and placement within parting lines and improved cold slug shape and placement in order to create more flexibility in the molding process and for example increase the number of injection gates that can be spaced within the mold without damaging adjacent dimples in a high throughput production scale.

Such a process/system, that is meanwhile implementable cost effectively within already existing RPIM systems, would be particularly desirable. The method and mold of the invention and resulting golf balls address and fill this need.

SUMMARY OF THE INVENTION

The injection molding methods and molds of the invention cost effectively overcome the above-described difficulties associated with molding TPU layers about subassemblies, especially when incorporating thin TPU covers into golf ball constructions. For example, the methods and molds of the invention offer improved injection gate shape and placement within the parting line as well as improved cold slug configuration, placement and design. In one embodiment, the method of molding a golf ball of the invention comprises the following steps. A mold having an upper mold cavity and a lower mold cavity is provided. Each mold cavity has an arcuate inner surface defining an inverted dimple and fret pattern; and the upper mold cavity and a lower mold cavity collectively create a mold having an interior spherical cavity for holding a golf ball subassembly when mated together to provide a mated mold.

The mated mold has a wave-shaped parting line that extends circumferentially about the mold at an interface between the upper mold cavity and the lower mold cavity; and the wave-shaped parting line contacts fret portions of the inverted dimple and fret pattern without contacting any dimple portion of the inverted dimple and fret pattern; and injection gates of a plurality of injection gates are spaced circumferentially about the mold within the wave-shaped parting line without intersecting any dimple of the dimple and fret pattern.

Additionally, the golf ball subassembly is loaded into the interior spherical cavity of the mold; the subassembly is secured within the mold using a plurality of retractable pins; a polymeric material is injected into the spherical cavity to mold a cover layer about the golf ball sub-assembly within the mold and form a molded golf ball; the retractable pins are withdrawn before molding is finished; the upper mold cavity and lower mold cavity are separated; and the molded golf ball is removed from the mold.

In a particular embodiment, the wave-shaped parting line has a maximum amplitude of 0.100 inches that is created about a phantom equator extending circumferentially about the mold and containing a plurality of midpoints between perimeters of opposing dimples at an interface between the upper mold cavity and the lower mold cavity. In one embodiment, the maximum amplitude is less than 0.100 inches. In another embodiment, the maximum amplitude is from about 0.015 inches to about 0.030 inches.

In a specific embodiment, the injection gates are equi-spaced circumferentially about the mold within the wave-shaped parting line.

In one embodiment, each injection gate is a minimum distance of 0.001 inches to about 0.010 inches from any portion of any dimple.

In a particular embodiment, each of the plurality of injection gates is oblong-shaped, and a center of each gate is located at an intersection of the interface and a phantom equator extending circumferentially about the mold such that no portion of any dimple located on opposing sides of the interface and being closest to the injection gate touches the injection gate. In one embodiment, the center of each oblong-shaped gate extends along the phantom equator. In a specific such embodiment, at least some of the injection gates are teardrop-shaped.

In one embodiment, the mold comprises at least 16 injection gates.

The injection gates of the plurality of injection gates are sized, contoured and spaced within the wave-shaped parting line such that the injection gates do not contact dimples during injection gate buffing and/or deflashing and/or when removing the molded golf ball from the mold.

The mold may further comprise a plurality of cold slug wells, each being disposed entirely inside the mold cavity and between consecutive injection gates and being sized, shaped and contoured to receive polymer that cools to a reduced viscosity within a runner of the mold while progressing toward the injection gate.

The invention also relates to a golf ball made according to a method of making a golf ball of the invention.

The invention also relates to an inventive mold used in the method of making a golf ball of the invention. The mold has an upper mold cavity; a lower mold cavity, and a plurality of retractable pins. Each mold cavity has an arcuate inner surface defining an inverted dimple and fret pattern and the upper mold cavity and a lower mold cavity collectively create a mold having an interior spherical cavity for holding a golf ball subassembly when mated together to provide a mated mold. The mated mold has a wave-shaped parting line that extends circumferentially about the mold at an interface between the upper mold cavity and the lower mold cavity; and the wave-shaped parting line contacts fret portions of the inverted dimple and fret pattern without contacting any dimple portion of the inverted dimple and fret pattern; and injection gates of a plurality of injection gates are spaced circumferentially about the mold within the wave-shaped parting line without intersecting any dimple of the dimple and fret pattern; and the retractable pins are sized, shaped and movable to secure the golf ball subassembly within the upper mold cavity and lower mold cavity during molding and withdraw before molding is finished.

The wave-shaped parting line may have a maximum amplitude of 0.100 inches that is created about a phantom equator extending circumferentially about the mold and containing a plurality of midpoints between perimeters of opposing dimples at an interface between the upper mold cavity and the lower mold cavity.

The maximum amplitude may be less than 0.100 inches. The maximum amplitude is from about 0.015 inches to about 0.030 inches.

The injection gates may be equi-spaced circumferentially about the mold within the wave-shaped parting line.

Each injection gate may be a minimum distance of 0.001 inches to about 0.010 inches from any portion of any dimple.

Each of the plurality of injection gates may be oblong-shaped, and a center of each gate located at an intersection of the interface and a phantom equator extending circumferentially about the mold such that no portion of any dimple located on opposing sides of the interface and being closest to the injection gate touches the injection gate.

The center of each oblong-shaped gate may extend along the phantom equator.

At least some of the injection gates may be teardrop-shaped.

The mold may comprise at least 16 injection gates.

Injection gates of the plurality of injection gates may be sized, contoured and spaced within the wave shaped parting line such that the injection gates do not contact dimples during injection gate buffing and/or deflashing and/or when removing the molded golf ball from the mold.

The mold may further comprise a plurality of cold slug wells, each being disposed entirely inside the mold cavity and between consecutive injection gates and being sized, shaped and contoured to receive polymer that cools to a reduced viscosity within a runner of the mold while progressing toward the injection gate.

The invention relates to golf ball comprising a cover layer made using the mold of the invention.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description in connection with the accompanying drawings in which:

DETAILED DESCRIPTION

Figure 1:
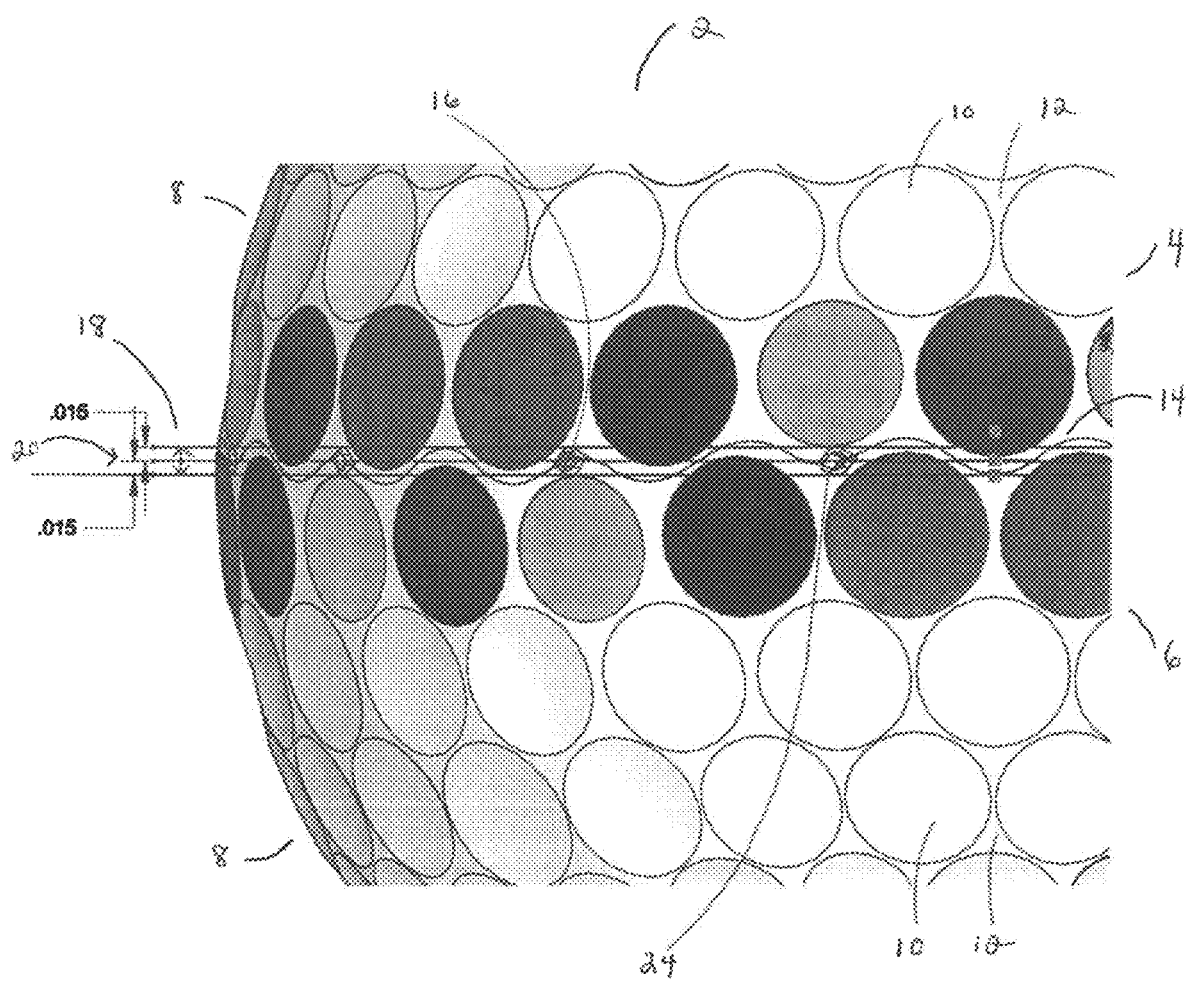
FIG. 1 is a side view of a portion of a mold of the invention used in a method of the invention according to one embodiment.

The injection molding methods and molds of the invention cost effectively improve, for example, the number, shape and placement of both the injection gates and the cold slugs within the mold in order to minimize any damage to dimples strategically positioned close to the parting line of a mold in order to maximize aerodynamic properties of the resulting golf ball.

In one embodiment, the method of molding a golf ball of the invention comprises the following steps. A mold having an upper mold cavity and a lower mold cavity is provided. Each mold cavity has an arcuate inner surface defining an inverted dimple and fret pattern; and the upper mold cavity and a lower mold cavity collectively create a mold having an interior spherical cavity for holding a golf ball subassembly when mated together to provide a mated mold.

The mated mold has a wave-shaped parting line that extends circumferentially about the mold at an interface between the upper mold cavity and the lower mold cavity; and the wave-shaped parting line contacts fret portions of the inverted dimple and fret pattern without contacting any dimple portion of the inverted dimple and fret pattern; and injection gates of a plurality of injection gates are spaced circumferentially about the mold within the wave-shaped parting line without intersecting any dimple of the dimple and fret pattern.

Additionally, the golf ball subassembly is loaded into the interior spherical cavity of the mold; the subassembly is secured within the mold using a plurality of retractable pins; a polymeric material is injected into the spherical cavity to mold a cover layer about the golf ball sub-assembly within the mold and form a molded golf ball; the retractable pins are withdrawn before molding is finished; the upper mold cavity and lower mold cavity are separated; and the molded golf ball is removed from the mold.

In a particular embodiment, the wave-shaped parting line has a maximum amplitude of 0.100 inches that is created about a phantom equator extending circumferentially about the mold and containing a plurality of midpoints between perimeters of opposing dimples at an interface between the upper mold cavity and the lower mold cavity. In one embodiment, the maximum amplitude is less than 0.100 inches. In another embodiment, the maximum amplitude is from about 0.015 inches to about 0.030 inches.

In a specific embodiment, the injection gates are equi-spaced circumferentially about the mold within the wave-shaped parting line.

In one embodiment, each injection gate is a minimum distance of 0.001 inches to about 0.010 inches from any portion of any dimple.

In a particular embodiment, each of the plurality of injection gates is oblong-shaped, and a center of each gate is located at an intersection of the interface and a phantom equator extending circumferentially about the mold such that no portion of any dimple located on opposing sides of the interface and being closest to the injection gate touches the injection gate. In one embodiment, the center of each oblong-shaped gate extends along the phantom equator.

In a specific such embodiment, at least some of the injection gates are teardrop-shaped. The oblong shape in general, and the teardrop-shape in particular reduces if not eliminates prior difficulties that would arise in conventional systems when trying to optimize injection gate placement without meanwhile limiting dimple placement at the parting line and therefore also negatively impacting aerodynamic properties of the resulting golf ball. The teardrop shaped injection gate in particular adds flexibility in the injection molding process by permitting use of a greater number of injection gates and meanwhile more ideal placement of dimples closer to the at parting line to optimize aerodynamic properties without subjecting those dimples to possible deformation or other damage especially when 16 or more injection gates are used which requires the injections gates to be close to each other, or when wide buffing is required to clean the gates.

In one embodiment, the mold comprises at least 16 injection gates.

The injection gates of the plurality of injection gates are sized, contoured and spaced within the wave-shaped parting line such that the injection gates do not contact dimples during injection gate buffing and/or deflashing and/or when removing the molded golf ball from the mold.

The mold may further comprise a plurality of cold slug wells, each being disposed entirely inside the mold cavity and between consecutive injection gates and being sized, shaped and contoured to receive polymer that cools to a reduced viscosity within a runner of the mold while progressing toward the injection gate.

The invention also relates to a golf ball made according to a method of making a golf ball of the invention.

The invention also relates to an inventive mold used in the method of making a golf ball of the invention. The mold has an upper mold cavity; a lower mold cavity, and a plurality of retractable pins. Each mold cavity has an arcuate inner surface defining an inverted dimple and fret pattern and the upper mold cavity and a lower mold cavity collectively create a mold having an interior spherical cavity for holding a golf ball subassembly when mated together to provide a mated mold. The mated mold has a wave-shaped parting line that extends circumferentially about the mold at an interface between the upper mold cavity and the lower mold cavity; and the wave-shaped parting line contacts fret portions of the inverted dimple and fret pattern without contacting any dimple portion of the inverted dimple and fret pattern; and injection gates of a plurality of injection gates are spaced circumferentially about the mold within the wave-shaped parting line without intersecting any dimple of the dimple and fret pattern; and the retractable pins are sized, shaped and movable to secure the golf ball subassembly within the upper mold cavity and lower mold cavity during molding and withdraw before molding is finished.

The mold wave-shaped parting line may have a maximum amplitude of 0.100 inches that is created about a phantom equator extending circumferentially about the mold and containing a plurality of midpoints between perimeters of opposing dimples at an interface between the upper mold cavity and the lower mold cavity.

The maximum amplitude may be less than 0.100 inches. The maximum amplitude is from about 0.015 inches to about 0.030 inches.

The injection gates may be equi-spaced circumferentially about the mold within the wave-shaped parting line.

Each injection gate may be a minimum distance of 0.001 inches to about 0.010 inches from any portion of any dimple.

Each injection gate of the plurality of injection gates may be oblong-shaped, and a center of each gate located at an intersection of the interface and a phantom equator extending circumferentially about the mold such that no portion of any dimple located on opposing sides of the interface and being closest to the injection gate touches the injection gate.

The center each oblong-shaped gate extends along the phantom equator.

At least some of the injection gates may be teardrop-shaped.

The mold may comprise at least 16 injection gates. In other embodiments, the mold may comprise greater than 16 injection gates, or even 18 or more injection gates. In some embodiments, the mold may have at least 12 injection gates.

The injection gates of the plurality of injection gates may be sized, contoured and spaced within the wave-shaped parting line such that the injection gates do not contact dimples during injection gate buffing and/or deflashing and/or when removing the molded golf ball from the mold.

The mold may further comprise a plurality of cold slug wells, each being disposed entirely inside the mold cavity and between consecutive injection gates and being sized, shaped and contoured to receive polymer that cools to a reduced viscosity within a runner of the mold while progressing toward the injection gate.

FIG. 1 is a side view of a portion of a mold of the invention used in a method of the invention according to one embodiment. Mated mold 2 includes upper mold cavity 4 and lower mold cavity 6, each having an outer surface 8 with dimples 10 and fret portions 12 therein, which extend through an entire thickness of each of upper mold cavity 4 and lower mold cavity 6 to produce a corresponding arcuate inner surface defining an inverted dimple (not shown). Mated mold 2 has a wave-shaped parting line 14 that extends circumferentially about mated mold 2 at an interface between upper mold cavity 4 and the lower mold cavity 6. Wave-shaped parting line 14 contacts fret portions 12 and does not contact any dimples 10. Injection gates 16 are spaced circumferentially about mated mold 2 within wave-shaped parting line 14 also without intersecting/contacting any dimples 10.

Wave-shaped parting line 14 has a maximum amplitude 18 that is created about a phantom equator 20 extending circumferentially about mated mold 2 and containing a plurality of midpoints 22 between perimeters of opposing dimples 10 at parting line 14. In FIG. 1, the maximum amplitude is 0.030 inches, based on an amplitude of 0.015 inches on either side of and about phantom equator 20.

In this embodiment, injection gates 16 are equi-spaced circumferentially about mated mold 2 within wave-shaped parting line 14, and each injection gate 16 is a minimum distance of 0.001 inches to about 0.010 inches from any portion of any dimple 10.

In this embodiment, each injection gate 16 is oblong-shaped, and a center 24 of each injection gate 16 is located at an intersection of parting line 14 and phantom equator 20. In this embodiment, center 24 of each oblong-shaped injection gate 16 extends along phantom equator 20. In this specific embodiment, at least some of injection gates 16 are teardrop-shaped.

Figure 2:
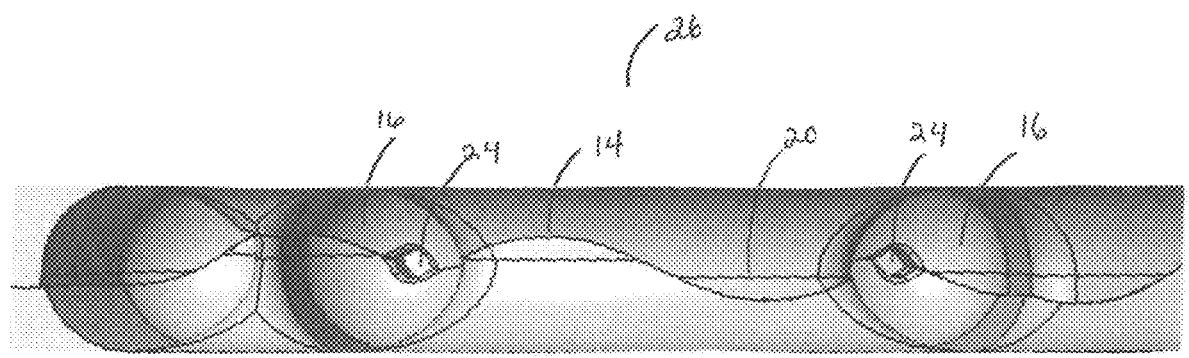
FIG. 2 is an enlarged portion of a parting line of a mold of the invention used in a method of the invention according to one embodiment.

FIG. 2 is an exploded view 26 of a portion of FIG. 1. Injection gates 16 having parting line 14 with maximum amplitude 18. Injection gates 16 are within wave-shaped parting line 14, is oblong-shaped, and has a center 24 that is located at an intersection of parting line 14 and phantom equator 20.

Figure 3:
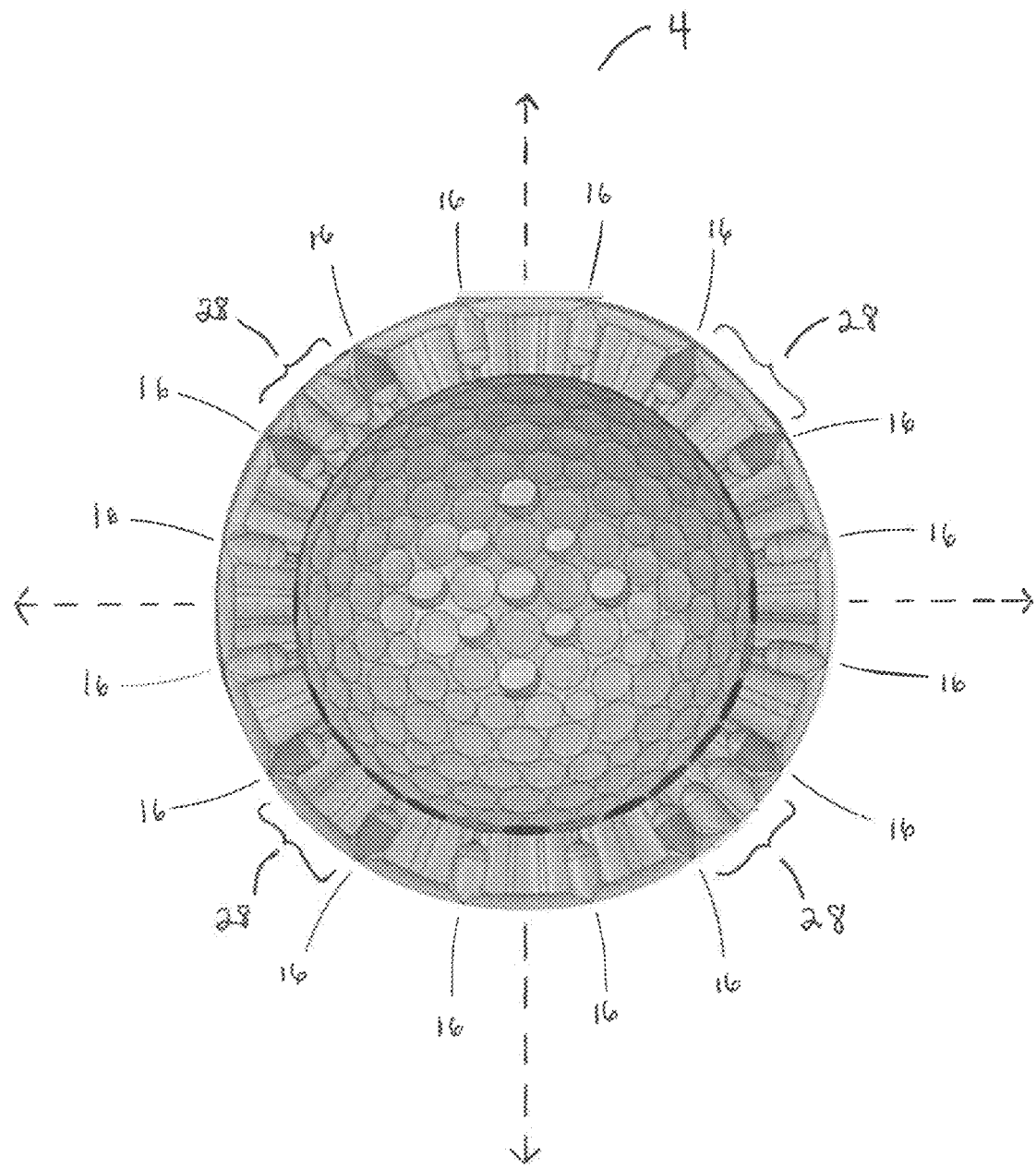
FIG. 3 is a top view of a mold cavity of the mold of the invention used in a method of the invention according to one embodiment.

In FIG. 3, upper mold cavity 4 includes a repeating pattern of injection gates 16 and inventive cold slug wells 28. There are four repetitions of the pattern in FIG. 3 which are highlighted therein using broken lines. All injection gates 16 and inventive cold slug wells 28 of the four pattern repetitions extend circumferentially about and are located entirely inside/within mold cavity 4; and cold slug wells 28 are sized, shaped and contoured to receive any runner polymer that cools within runner 30 while progressing toward injection gates 16.

Figure 4:
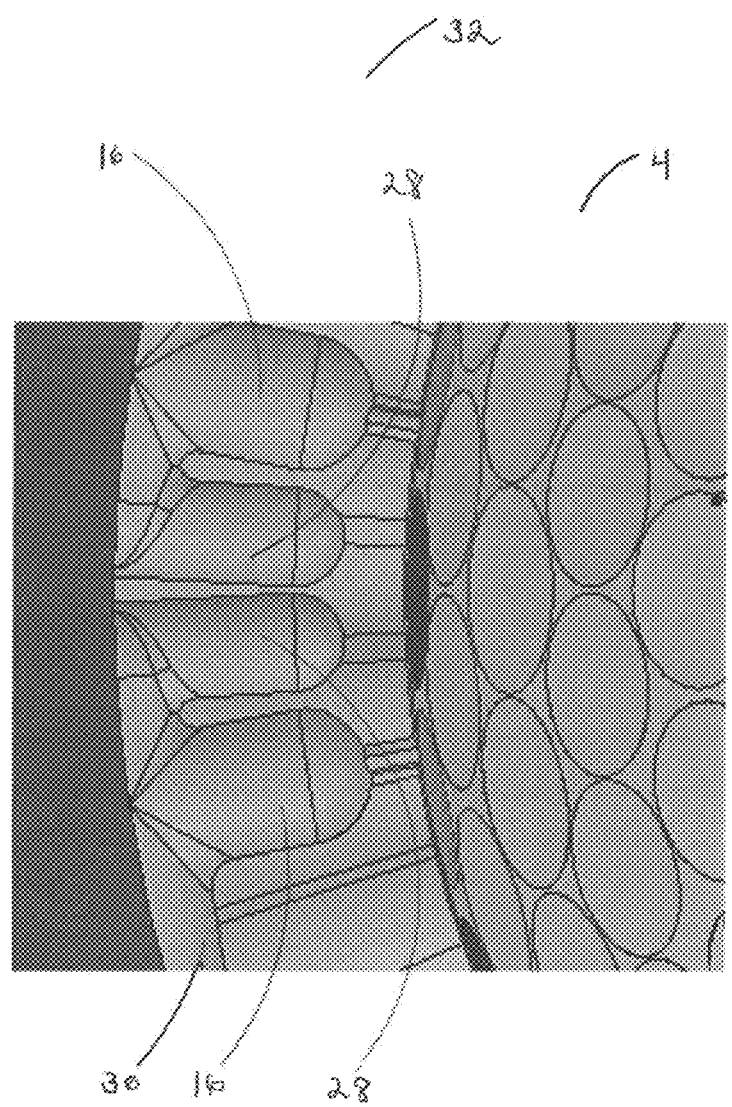
FIG. 4 depicts an enlarged view of a portion of a mold cavity including an inventive cold slug well design and construction according to one embodiment.

FIG. 4 is an exploded view 32 of a portion of upper mold cavity 4 of FIG. 3, highlighting two injection gates 16 and two inventive cold slug wells 28 of the pattern, wherein each of cold slug wells 28 receive runner polymer that cools within runner 30 while progressing toward injection gates 16 within upper mold cavity 4.

Figure 5:
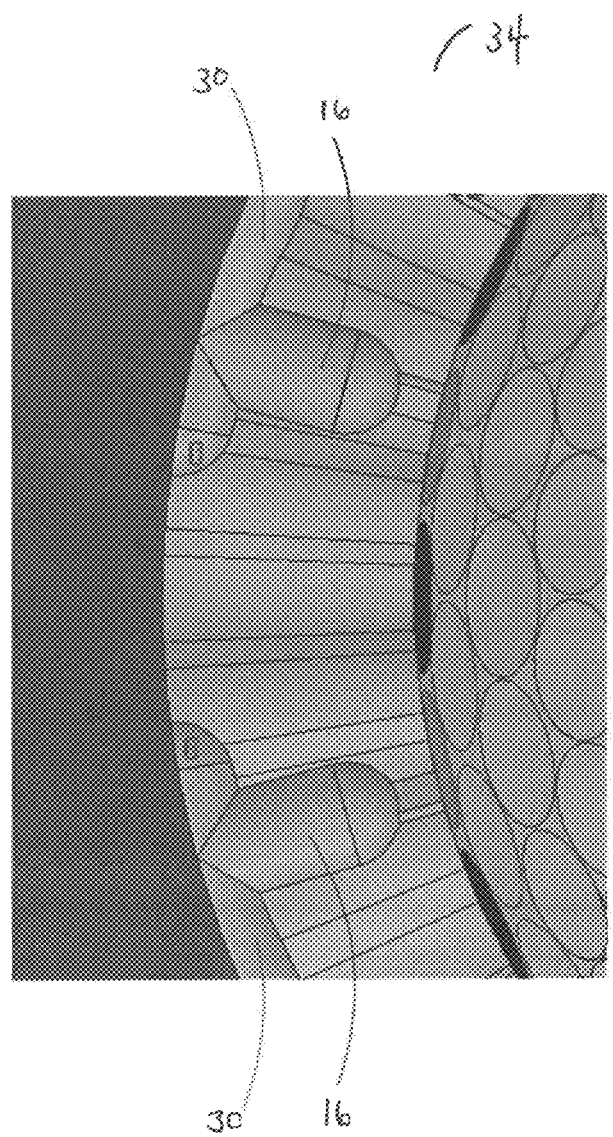
FIG. 5 depicts an enlarged view of a portion of a mold cavity including a conventional cold slug well design and construction.

In contrast to the inventive repeating pattern and placing of injection gates 16 and inventive cold slug wells 28 of FIG. 4, FIG. 5 depicts an exploded view 34 of conventional (prior art) cold slugs B which extend beyond and parallel to runners 30 and circumferentially about a traditional parting line of the mold 38 (mold cavities). Notably in contrast, inventive cold slug wells 28 of FIG. 4 distinguishable extend perpendicular to runners 30 and radially inward toward a center of the subassembly secured within the mold, with adjacent injection gates 16 also extending radially inward toward a center of the subassembly that is secured within the mold during molding.

A golf ball of the invention includes a cover layer made using the mold of the invention. Golf balls having various constructions may be made in accordance with this invention. For example, golf balls having three piece, four-piece, and five-piece constructions with single or multi-layered cover materials may be made. Representative illustrations of such golf ball constructions are provided and discussed further below.

The term, "layer" as used herein means generally any spherical portion of the golf ball. More particularly, in one version, a two-piece golf ball containing a core and having a surrounding cover is made. Three-piece golf balls containing a dual-layered core and single-layered cover also can be made. The dual-core includes an inner core (center) and surrounding outer core layer. In another version, a four-piece golf ball containing a dual-core and dual-cover (inner cover and outer cover layers) is made. In yet another construction, a four-piece or five-piece golf ball containing a dual-core; casing layer(s); and cover layer(s) may be made. As used herein, the term, "casing layer" means a layer of the ball disposed between the multi-layered core sub-assembly and cover. The casing layer also may be referred to as a mantle or intermediate layer. The diameter and thickness of the different layers along with properties such as hardness and compression may vary depending upon the construction and desired playing performance properties of the golf ball as discussed further below.

Core Structure

The golf ball may contain a single- or multi-layered core. In one preferred embodiment, at least one of the core layers is formed of a rubber composition comprising polybutadiene rubber material. More particularly, in one version, the ball contains a single inner core formed of the polybutadiene rubber composition. In a second version, the ball contains a dual-core comprising an inner core (center) and surrounding outer core layer.

In one version, the core is formed of a rubber composition comprising a rubber material such as, for example, polybutadiene, ethylene-propylene rubber, ethylene-propylene-diene rubber, polyisoprene, styrene-butadiene rubber, polyalkenamers, butyl rubber, halobutyl rubber, or polystyrene elastomers. For example, polybutadiene rubber compositions may be used to form the inner core (center) and surrounding outer core layer in a dual-layer construction. In another version, the core may be formed from an ionomer composition comprising an ethylene acid copolymer containing acid groups such that greater than 70% of the acid groups are neutralized. These highly neutralized polymers (HNPs) also may be used to form at least one core layer in a multi-layered core construction. For example, a polybutadiene rubber composition may be used to form the center and a HNP composition may be used to form the outer core. Such rubber and HNP compositions are discussed in further detail below.

In general, polybutadiene is a homopolymer of 1, 3-butadiene. The double bonds in the 1, 3-butadiene monomer are attacked by catalysts to grow the polymer chain and form a polybutadiene polymer having a desired molecular weight. Any suitable catalyst may be used to synthesize the polybutadiene rubber depending upon the desired properties. Normally, a transition metal complex (for example, neodymium, nickel, or cobalt) or an alkyl metal such as alkyllithium is used as a catalyst. Other catalysts include, but are not limited to, aluminum, boron, lithium, titanium, and combinations thereof. The catalysts produce polybutadiene rubbers having different chemical structures. In a cis-bond configuration, the main internal polymer chain of the polybutadiene appears on the same side of the carbon-carbon double bond contained in the polybutadiene. In a trans-bond configuration, the main internal polymer chain is on opposite sides of the internal carbon-carbon double bond in the polybutadiene. The polybutadiene rubber can have various combinations of cis- and trans-bond structures. A preferred polybutadiene rubber has a 1,4 cis-bond content of at least 40%, preferably greater than 80%, and more preferably greater than 90%. In general, polybutadiene rubbers having a high 1,4 cis-bond content have high tensile strength. The polybutadiene rubber may have a relatively high or low Mooney viscosity.

Examples of commercially-available polybutadiene rubbers that can be used in accordance with this invention, include, but are not limited to, BR 01 and BR 1220, available from BST Elastomers of Bangkok, Thailand; SE BR 1220LA and SE BR1203, available from DOW Chemical Co of Midland, Mich.; BUDENE 1207, 1207s, 1208, and 1280 available from Goodyear, Inc of Akron, Ohio; BR 01, 51 and 730, available from Japan Synthetic Rubber (JSR) of Tokyo, Japan; BUNA CB 21, CB 22, CB 23, CB 24, CB 25, CB 29 MES, CB 60, CB Nd 60, CB 55 NF, CB 70 B, CB KA 8967, and CB 1221, available from Lanxess Corp. of Pittsburgh. Pa.; BR1208, available from LG Chemical of Seoul, South Korea; UBEPOL BR130B, BR150, BR150B, BR150L, BR230, BR360L, BR710, and VCR617, available from UBE Industries, Ltd. of Tokyo, Japan; EUROPRENE NEO-CIS BR 60, INTENE 60 AF and P30AF, and EUROPRENE BR HV80, available from Polimeri Europa of Rome, Italy; AFDENE 50 and NEODENE BR40, BR45, BR50 and BR60, available from Karbochem (PTY) Ltd. of Bruma, South Africa; KBR 01, NdBr 40, NdBR-45, NdBr 60, KBR 710S, KBR 710H, and KBR 750, available from Kumho Petrochemical Co., Ltd. Of Seoul, South Korea; and DIENE 55NF, 70AC, and 320 AC, available from Firestone Polymers of Akron, Ohio.

To form the core, the polybutadiene rubber is used in an amount of at least about 5% by weight based on total weight of composition and is generally present in an amount of about 5% to about 100%, or an amount within a range having a lower limit of 5% or 10% or 20% or 30% or 40% or 50% and an upper limit of 55% or 60% or 70% or 80% or 90% or 95% or 100%. In general, the concentration of polybutadiene rubber is about 45 to about 95 weight percent. Preferably, the rubber material used to form the core layer comprises at least 50% by weight, and more preferably at least 70% by weight, polybutadiene rubber.

The rubber compositions of this invention may be cured, either by pre-blending or post-blending, using conventional curing processes. Suitable curing processes include, for example, peroxide-curing, sulfur-curing, high-energy radiation, and combinations thereof. Preferably, the rubber composition contains a free-radical initiator selected from organic peroxides, high energy radiation sources capable of generating free-radicals, and combinations thereof. In one preferred version, the rubber composition is peroxide-cured. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butylperoxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel. Peroxide free-radical initiators are generally present in the rubber composition in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubbers, and an upper limit of 2.5 parts or 3 parts or 5 parts or 6 parts or 10 parts or 15 parts by weight per 100 parts of the total rubber. Concentrations are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.

The rubber compositions preferably include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particular examples of suitable metal salts include, but are not limited to, one or more metal salts of acrylates, diacrylates, methacrylates, and dimethacrylates, wherein the metal is selected from magnesium, calcium, zinc, aluminum, lithium, and nickel. In a particular embodiment, the co-agent is selected from zinc salts of acrylates, diacrylates, methacrylates, and dimethacrylates. In another particular embodiment, the agent is zinc diacrylate (ZDA). When the co-agent is zinc diacrylate and/or zinc dimethacrylate, the co-agent is typically included in the rubber composition in an amount within the range having a lower limit of 1 or 5 or 10 or 15 or 19 or 20 parts by weight per 100 parts of the total rubber, and an upper limit of 24 or 25 or 30 or 35 or 40 or 45 or 50 or 60 parts by weight per 100 parts of the base rubber.

Radical scavengers such as a halogenated organosulfur or metal salt thereof, organic disulfide, or inorganic disulfide compounds may be added to the rubber composition. These compounds also may function as "soft and fast agents." As used herein, "soft and fast agent" means any compound or a blend thereof that is capable of making a core: 1) softer (having a lower compression) at a constant "coefficient of restitution" (COR); and/or 2) faster (having a higher COR at equal compression), when compared to a core equivalently prepared without a soft and fast agent. Preferred halogenated organosulfur compounds include, but are not limited to, pentachlorothiophenol (PCTP) and salts of PCTP such as zinc pentachlorothiophenol (ZnPCTP). Using PCTP and ZnPCTP in golf ball inner cores helps produce softer and faster inner cores. The PCTP and ZnPCTP compounds help increase the resiliency and the coefficient of restitution of the core. In a particular embodiment, the soft and fast agent is selected from ZnPCTP, PCTP, ditolyl disulfide, diphenyl disulfide, dixylyl disulfide, 2-nitroresorcinol, and combinations thereof.

The rubber compositions of the present invention also may include "fillers," which are added to adjust the density and/or specific gravity of the material. Suitable fillers include, but are not limited to, polymeric or mineral fillers, metal fillers, metal alloy fillers, metal oxide fillers and carbonaceous fillers. The fillers can be in any suitable form including, but not limited to, flakes, fibers, whiskers, fibrils, plates, particles, and powders. Rubber regrind, which is ground, recycled rubber material (for example, ground to about 30 mesh particle size) obtained from discarded rubber golf ball cores, also can be used as a filler. The amount and type of fillers utilized are governed by the amount and weight of other ingredients in the golf ball, since a maximum golf ball weight of 45.93 g (1.62 ounces) has been established by the United States Golf Association (USGA).

Suitable polymeric or mineral fillers that may be added to the rubber composition include, for example, precipitated hydrated silica, clay, talc, asbestos, glass fibers, aramid fibers, mica, calcium metasilicate, barium sulfate, zinc sulfide, lithopone, silicates, silicon carbide, tungsten carbide, diatomaceous earth, polyvinyl chloride, carbonates such as calcium carbonate and magnesium carbonate. Suitable metal fillers include titanium, tungsten, aluminum, bismuth, nickel, molybdenum, iron, lead, copper, boron, cobalt, beryllium, zinc, and tin. Suitable metal alloys include steel, brass, bronze, boron carbide whiskers, and tungsten carbide whiskers. Suitable metal oxide fillers include zinc oxide, iron oxide, aluminum oxide, titanium oxide, magnesium oxide, and zirconium oxide. Suitable particulate carbonaceous fillers include graphite, carbon black, cotton flock, natural bitumen, cellulose flock, and leather fiber. Micro balloon fillers such as glass and ceramic, and fly ash fillers can also be used. In a particular aspect of this embodiment, the rubber composition includes filler(s) selected from carbon black, nanoclays (e.g., Cloisite® and Nanofil® nanoclays, commercially available from Southern Clay Products, Inc., and Nanomax® and Nanomer® nanoclays, commercially available from Nanocor, Inc.), talc (e.g., Luzenac HAR® high aspect ratio talcs, commercially available from Luzenac America, Inc.), glass (e.g., glass flake, milled glass, and microglass), mica and mica-based pigments (e.g., Iriodin® pearl luster pigments, commercially available from The Merck Group), and combinations thereof. In a particular embodiment, the rubber composition is modified with organic fiber micropulp.

In addition, the rubber compositions may include antioxidants to prevent the breakdown of the elastomers. Also, processing aids such as high molecular weight organic acids and salts thereof, may be added to the composition. In a particular embodiment, the total amount of additive(s) and filler(s) present in the rubber composition is 15 wt % or less, or 12 wt % or less, or 10 wt % or less, or 9 wt % or less, or 6 wt % or less, or 5 wt % or less, or 4 wt % or less, or 3 wt % or less, based on the total weight of the rubber composition.

The polybutadiene rubber material (base rubber) may be blended with other elastomers in accordance with this invention. Other elastomers include, but are not limited to, polybutadiene, polyisoprene, ethylene propylene rubber ("EPR"), styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof.

The polymers, free-radical initiators, filler, cross-linking agents, and any other materials used in forming either the golf ball center or any portion of the core, in accordance with invention, may be combined to form a mixture by any type of mixing known to one of ordinary skill in the art. Suitable types of mixing include single pass and multi-pass mixing, and the like. The cross-linking agent, and any other optional additives used to modify the characteristics of the golf ball center or additional layer(s), may similarly be combined by any type of mixing. A single-pass mixing process where ingredients are added sequentially is preferred, as this type of mixing tends to increase efficiency and reduce costs for the process. The preferred mixing cycle is single step wherein the polymer, cis-to-trans catalyst, filler, zinc diacrylate, and peroxide are added in sequence.

In one preferred embodiment, the entire core or at least one core layer in a multi-layered structure is formed of a rubber composition comprising a material selected from the group of natural and synthetic rubbers including, but not limited to, polybutadiene, polyisoprene, ethylene propylene rubber ("EPR"), ethylene-propylene-diene ("EPDM") rubber, styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof.

As discussed above, single and multi-layered cores can be made in accordance with this invention. In two-layered cores, a thermoset material such as, for example, thermoset rubber, can be used to make the outer core layer or a thermoplastic material such as, for example, ethylene acid copolymer containing acid groups that are at least partially or fully neutralized can be used to make the outer core layer. Suitable ionomer compositions include partially-neutralized ionomers and highly-neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers. Suitable ethylene acid copolymer ionomers and other thermoplastics that can be used to form the core layer(s) are the same materials that can be used to make an inner cover layer as discussed further below.

In another example, multi-layered cores having an inner core, intermediate core layer, and outer core layer, wherein the intermediate core layer is disposed between the intermediate and outer core layers may be prepared in accordance with this invention. More particularly, as discussed above, the inner core may be constructed from a thermoplastic or thermoset composition, such as thermoset rubber. Meanwhile, the intermediate and outer core layers also may be formed from thermoset or thermoplastic materials. Suitable thermoset and thermoplastic compositions that may be used to form the intermediate/outer core layers are discussed above. For example, each of the intermediate and outer core layers may be formed from a thermoset rubber composition. Thus, the intermediate core layer may be formed from a first thermoset rubber composition; and the outer core layer may be formed from a second thermoset rubber composition. In another embodiment, the intermediate core layer is formed from a thermoset composition; and the outer core layer is formed from a thermoplastic composition. In a third embodiment, the intermediate core layer is formed from a thermoplastic composition; and the outer core layer is formed from a thermoset composition. Finally, in a fourth embodiment, the intermediate core layer is formed from a first thermoplastic composition; and the outer core layer is formed from a second thermoplastic compositions.

In a particular embodiment, the core includes at least one additional thermoplastic intermediate core layer formed from a composition comprising an ionomer selected from DuPont® HPF ESX 367, HPF 1000, HPF 2000, HPF AD1035, HPF AD1035 Soft, HPF AD1040, and AD1172 ionomers, commercially available from E. I. du Pont de Nemours and Company. The coefficient of restitution ("COR"), compression, and surface hardness of each of these materials, as measured on 1.55" injection molded spheres aged two weeks at 23° C./50% RH, are given in Table 1 below.

TABLE 1

| Example | Solid Sphere COR | Solid Sphere Compression | Solid Sphere Shore D Surface Hardness |
|---|---|---|---|
| HPF 1000 | 0.830 | 115 | 54 |
| HPF 2000 | 0.860 | 90 | 47 |
| HPF AD1035 | 0.820 | 63 | 42 |
| HPF AD1035 Soft | 0.780 | 33 | 35 |
| HPF AD 1040 | 0.855 | 135 | 60 |
| HPF AD1172 | 0.800 | 32 | 37 |

Cover Layer Structure

The golf balls of this invention further include an outer cover layer preferably made of a thermoplastic polyurethane composition. In general, polyurethanes contain urethane linkages formed by reacting an isocyanate group (—N═C═O) with a hydroxyl group (OH). The polyurethanes are produced by the reaction of a multi-functional isocyanate (NCO—R—NCO) with a long-chain polyol having terminal hydroxyl groups (OH—OH) in the presence of a catalyst and other additives. The chain length of the polyurethane prepolymer is extended by reacting it with short-chain diols (OH—R'—OH). The resulting polyurethane has elastomeric properties because of its "hard" and "soft" segments, which are covalently bonded together. This phase separation occurs because the mainly non-polar, low melting soft segments are incompatible with the polar, high melting hard segments. The hard segments, which are formed by the reaction of the diisocyanate and low molecular weight chain-extending diol, are relatively stiff and immobile. The soft segments, which are formed by the reaction of the diisocyanate and long chain diol, are relatively flexible and mobile. Because the hard segments are covalently coupled to the soft segments, they inhibit plastic flow of the polymer chains, thus creating elastomeric resiliency.

By the term, "isocyanate compound" as used herein, it is meant any aliphatic or aromatic isocyanate containing two or more isocyanate functional groups. The isocyanate compounds can be monomers or monomeric units, because they can be polymerized to produce polymeric isocyanates containing two or more monomeric isocyanate repeat units. The isocyanate compound may have any suitable backbone chain structure including saturated or unsaturated, and linear, branched, or cyclic. These isocyanate compounds also can be referred to as polyisocyanates or multi-functional isocyanates. By the term, "polyamine" as used herein, it is meant any aliphatic or aromatic compound containing two or more primary or secondary amine functional groups. The polyamine compound may have any suitable backbone chain structure including saturated or unsaturated, and linear, branched, or cyclic. The term "polyamine" may be used interchangeably with amine-terminated component. These polyamines also can be referred to as amine compounds or multi-functional amines. By the term, "polyol" as used herein, it is meant any aliphatic or aromatic compound containing two or more hydroxyl functional groups. The term "polyol" may be used interchangeably with hydroxy-terminated component. By the term, "polyimine compound", it is meant it is meant any aliphatic or aromatic compound containing two or more imine functional groups. These polyimines also can be referred to as imine compounds or multi-functional imines.

Thermoplastic polyurethanes have minimal cross-linking; any bonding in the polymer network is primarily through hydrogen bonding or other physical mechanism. Because of their lower level of cross-linking, thermoplastic polyurethanes are relatively flexible. The cross-linking bonds in thermoplastic polyurethanes can be reversibly broken by increasing temperature such as during molding or extrusion. That is, the thermoplastic material softens when exposed to heat and returns to its original condition when cooled. On the other hand, thermoset polyurethanes become irreversibly set when they are cured. The cross-linking bonds are irreversibly set and are not broken when exposed to heat. Thus, thermoset polyurethanes, which typically have a high level of cross-linking, are relatively rigid.

Commercially-available examples of suitable thermoplastic polyurethanes that can be used in accordance with this invention include TPUs sold under the tradenames of Texin® 250, Texin® 255, Texin® 260, Texin® 270, Texin® 950U, Texin® 970U, Texin® 1049, Texin® 990DP7-1191, Texin® DP7-1202, Texin® 990R, Texin® 993, Texin® DP7-1049, Texin® 3203, Texin® 4203, Texin® 4206, Texin® 4210, Texin® 4215, and Texin® 3215, each commercially available from Covestro LLC, Pittsburgh Pa.; Estane® 50 DT3, Estane® 58212, Estane® 55DT3, Estane® 58887, Estane® EZ14-23A, Estane® ETE 50DT3, each commercially available from Lubrizol Company of Cleveland, Ohio; and Elastollan® WY1149, Elastollan® 1154D53, Elastollan® 1180A, Elastollan® 1190A, Elastollan® 1195A, Elastollan® 1185AW, Elastollan® 1175AW, each commercially available from BASF; Desmopan® 453, commercially available from Bayer of Pittsburgh, Pa., and the E-Series TPUs, such as D 60 E 4024 commercially available from Huntsman Polyurethanes of Germany.

Aromatic polyurethanes can be prepared in accordance with this invention and these materials are preferably formed by reacting an aromatic diisocyanate with a polyol. Suitable aromatic diisocyanates that may be used in accordance with this invention include, for example, toluene 2,4-diisocyanate (TDI), toluene 2,6-diisocyanate (TDI), 4,4'-methylene diphenyl diisocyanate (MDI), 2,4'-methylene diphenyl diisocyanate (MDI), polymeric methylene diphenyl diisocyanate (PMDI), p-phenylene diisocyanate (PPDI), m-phenylene diisocyanate (PDI), naphthalene 1,5-diisocynate (NDI), naphthalene 2,4-diisocyanate (NDI), p-xylene diisocyanate (XDI), and homopolymers and copolymers and blends thereof. The aromatic isocyanates are able to react with the hydroxyl or amine compounds and form a durable and tough polymer having a high melting point. The resulting polyurethane generally has good mechanical strength and cut/shear-resistance.

Aliphatic polyurethanes also can be prepared in accordance with this invention and these materials are preferably formed by reacting an aliphatic diisocyanate with a polyol. Suitable aliphatic diisocyanates that may be used in accordance with this invention include, for example, isophorone diisocyanate (IPDI), 1,6-hexamethylene diisocyanate (HDI), 4,4'-dicyclohexylmethane diisocyanate ("$H_{12}$ MDI"), meta-tetramethylxylyene diisocyanate (TMXDI), trans-cyclohexane diisocyanate (CHDI), and homopolymers and copolymers and blends thereof. Particularly suitable multifunctional isocyanates include trimers of HDI or $H_{12}$ MDI, oligomers, or other derivatives thereof. The resulting polyurethane generally has good light and thermal stability.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol (PTMEG) which is particularly preferred, polyethylene propylene glycol, polyoxypropylene glycol, and mixtures thereof. The hydrocarbon chain can have saturated or unsaturated bonds and substituted or unsubstituted aromatic and cyclic groups.

In another embodiment, polyester polyols are included in the polyurethane material. Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof. The hydrocarbon chain can have saturated or unsaturated bonds, or substituted or unsubstituted aromatic and cyclic groups. In still another embodiment, polycaprolactone polyols are included in the materials of the invention. Suitable polycaprolactone polyols include, but are not limited to: 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups. In yet another embodiment, polycarbonate polyols are included in the polyurethane material of the invention. Suitable polycarbonates include, but are not limited to, polyphthalate carbonate and poly(hexamethylene carbonate) glycol. The hydrocarbon chain can have saturated or unsaturated bonds, or substituted or unsubstituted aromatic and cyclic groups. In one embodiment, the molecular weight of the polyol is from about 200 to about 4000.

There are two basic techniques that can be used to make the polyurethanes: a) one-shot technique, and b) prepolymer technique. In the one-shot technique, the diisocyanate, polyol, and hydroxyl-terminated chain-extender (curing agent) are reacted in one step. On the other hand, the prepolymer technique involves a first reaction between the diisocyanate and polyol compounds to produce a polyurethane prepolymer, and a subsequent reaction between the prepolymer and hydroxyl-terminated chain-extender. As a result of the reaction between the isocyanate and polyol compounds, there will be some unreacted NCO groups in the polyurethane prepolymer. The prepolymer should have less than 14% unreacted NCO groups. Preferably, the prepolymer has no greater than 8.5% unreacted NCO groups, more preferably from 2.5% to 8%, and most preferably from 5.0% to 8.0% unreacted NCO groups. As the weight percent of unreacted isocyanate groups increases, the hardness of the composition also generally increases.

Either the one-shot or prepolymer method may be employed to produce the polyurethane compositions of the invention. In one embodiment, the one-shot method is used, wherein the isocyanate compound is added to a reaction vessel and then a curative mixture comprising the polyol and curing agent is added to the reaction vessel. The components are mixed together so that the molar ratio of isocyanate groups to hydroxyl groups is preferably in the range of about 1.00:1.00 to about 1.10:1.00. In a second embodiment, the prepolymer method is used. In general, the prepolymer technique is preferred because it provides better control of the chemical reaction. The prepolymer method provides a more homogeneous mixture resulting in a more consistent polymer composition. The one-shot method results in a mixture that is inhomogeneous (more random) and affords the manufacturer less control over the molecular structure of the resultant composition.

The polyurethane compositions can be formed by chain-extending the polyurethane prepolymer with a single chain-extender or blend of chain-extenders as described further below. As discussed above, the polyurethane prepolymer can be chain-extended by reacting it with a single chain-extender or blend of chain-extenders. In general, the prepolymer can be reacted with hydroxyl-terminated curing agents, amine-terminated curing agents, and mixtures thereof. The curing agents extend the chain length of the prepolymer and build-up its molecular weight. In general, thermoplastic polyurethane compositions are typically formed by reacting the isocyanate blend and polyols at a 1:1 stoichiometric ratio. Thermoset compositions, on the other hand, are cross-linked polymers and are typically produced from the reaction of the isocyanate blend and polyols at normally a 1.05:1 stoichiometric ratio A catalyst may be employed to promote the reaction between the isocyanate and polyol compounds for producing the prepolymer or between prepolymer and chain-extender during the chain-extending step. Preferably, the catalyst is added to the reactants before producing the prepolymer. Suitable catalysts include, but are not limited to, bismuth catalyst; zinc octoate; stannous octoate; tin catalysts such as bis-butyltin dilaurate, bis-butyltin diacetate, stannous octoate; tin (II) chloride, tin (IV) chloride, bis-butyltin dimethoxide, dimethyl-bis[1-oxonedecyl)oxy]stannane, di-n-octyltin bis-isooctyl mercaptoacetate; amine catalysts such as triethylenediamine, triethylamine, and tributylamine; organic acids such as oleic acid and acetic acid; delayed catalysts; and mixtures thereof. The catalyst is preferably added in an amount sufficient to catalyze the reaction of the components in the reactive mixture. In one embodiment, the catalyst is present in an amount from about 0.001 percent to about 1 percent, and preferably 0.1 to 0.5 percent, by weight of the composition.

The hydroxyl chain-extending (curing) agents are preferably selected from the group consisting of ethylene glycol; diethylene glycol; polyethylene glycol; propylene glycol; 2-methyl-1,3-propanediol; 2-methyl-1,4-butanediol; monoethanolamine; diethanolamine; triethanolamine; monoisopropanolamine; diisopropanolamine; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; N,N,N',N'-tetra-(2-hydroxypropyl)-ethylene diamine; diethylene glycol bis-(aminopropyl) ether; 1,5-pentanediol; 1,6-hexanediol; 1,3-bis-(2-hydroxyethoxy) cyclohexane; 1,4-cyclohexyldimethylol; 1,3-bis-[2-(2-hydroxyethoxy) ethoxy]cyclohexane; 1,3-bis-{2-[2-(2-hydroxyethoxy) ethoxy]ethoxy}cyclohexane; trimethylolpropane; polytetramethylene ether glycol (PTMEG), preferably having a molecular weight from about 250 to about 3900; and mixtures thereof.

Suitable amine chain-extending (curing) agents that can be used in chain-extending the polyurethane prepolymer include, but are not limited to, unsaturated diamines such as 4,4'-diamino-diphenylmethane (i.e., 4,4'-methylene-dianiline or "MDA"), m-phenylenediamine, p-phenylenediamine, 1,2- or 1,4-bis(sec-butylamino)benzene, 3,5-diethyl-(2,4- or 2,6-) toluenediamine or "DETDA", 3,5- dimethylthio-(2,4- or 2,6-)toluenediamine, 3,5-diethylthio-(2,4- or 2,6-)toluenediamine, 3,3'-dimethyl-4,4'-diamino-diphenylmethane, 3,3'-diethyl-5,5'-dimethyl 4,4'-diamino-diphenylmethane (i.e., 4,4'-methylene-bis(2-ethyl-6-methyl-benezeneamine)), 3,3'-dichloro-4,4'-diamino-diphenylmethane (i.e., 4,4'-methylene-bis(2-chloroaniline) or "MOCA"), 3,3',5,5'-tetraethyl-4,4'-diamino-diphenyl-methane (i.e., 4,4'-methylene-bis(2,6-diethylaniline), 2,2'-dichloro-3,3',5,5'-tetraethyl-4,4'-diamino-diphenylmethane (i.e., 4,4'-methylene-bis(3-chloro-2,6-diethyleneaniline) or "MCDEA"), 3,3'-diethyl-5,5'-dichloro-4,4'-diamino-diphenylmethane, or "MDEA"), 3,3'-dichloro-2,2',6,6'-tetraethyl-4,4'-diamino-diphenylmethane, 3,3'-dichloro-4,4'-diamino-diphenylmethane, 4,4'-methylene-bis(2,3-dichloroaniline) (i.e., 2,2',3,3'-tetrachloro-4,4'-diamino-diphenylmethane or "MDCA"); and mixtures thereof. One particularly suitable amine-terminated chain-extending agent is Ethacure300™ (dimethylthiotoluenediamine or a mixture of 2,6-diamino-3,5-dimethylthiotoluene and 2,4-diamino-3,5-dimethylthiotoluene.) The amine curing agents used as chain extenders normally have a cyclic structure and a low molecular weight (250 or less).

When the polyurethane prepolymer is reacted with hydroxyl-terminated curing agents during the chain-extending step, as described above, the resulting polyurethane composition contains urethane linkages. On the other hand, when the polyurethane prepolymer is reacted with amine-terminated curing agents during the chain-extending step, any excess isocyanate groups in the prepolymer will react with the amine groups in the curing agent. The resulting polyurethane composition contains urethane and urea linkages and may be referred to as a polyurethane/urea hybrid. The concentration of urethane and urea linkages in the hybrid composition may vary. In general, the hybrid composition may contain a mixture of about 10 to 90% urethane and about 90 to 10% urea linkages.

More particularly, when the polyurethane prepolymer is reacted with hydroxyl-terminated curing agents during the chain-extending step, as described above, the resulting composition is essentially a pure polyurethane composition containing urethane linkages having the following general structure:

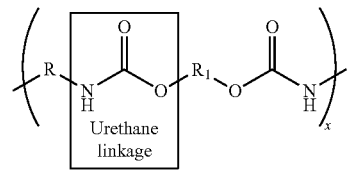

where x is the chain length, i.e., about 1 or greater, and R and $R_1$ are straight chain or branched hydrocarbon chain having about 1 to about 20 carbons.

However, when the polyurethane prepolymer is reacted with an amine-terminated curing agent during the chain-extending step, any excess isocyanate groups in the prepolymer will react with the amine groups in the curing agent and create urea linkages having the following general structure:

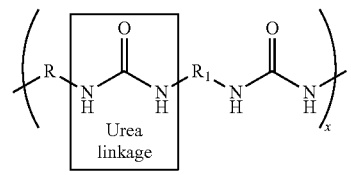

where x is the chain length, i.e., about 1 or greater, and R and $R_1$ are straight chain or branched hydrocarbon chain having about 1 to about 20 carbons.

The polyurethane compositions used to form the cover layer may contain other polymer materials including, for example: aliphatic or aromatic polyurethanes, aliphatic or aromatic polyureas, aliphatic or aromatic polyurethane/urea hybrids, olefin-based copolymer ionomer compositions, polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, available from Arkema Inc; cross-linked trans-polyisoprene and blends thereof; polyester-based thermoplastic elastomers, such as Hytrel®, available from DuPont; polyurethane-based thermoplastic elastomers, such as Elastollan®, available from BASF; polycarbonate/polyester blends such as Xylex®, available from SABIC Innovative Plastics; maleic anhydride-grafted polymers such as Fusabond®, available from DuPont; and mixtures of the foregoing materials.

In addition, the polyurethane compositions may contain fillers, additives, and other ingredients that do not detract from the properties of the final composition. These additional materials include, but are not limited to, catalysts, wetting agents, coloring agents, optical brighteners, cross-linking agents, whitening agents such as titanium dioxide and zinc oxide, ultraviolet (UV) light absorbers, hindered amine light stabilizers, defoaming agents, processing aids, surfactants, and other conventional additives. Other suitable additives include antioxidants, stabilizers, softening agents, plasticizers, including internal and external plasticizers, impact modifiers, foaming agents, density-adjusting fillers, reinforcing materials, compatibilizers, and the like. Some examples of useful fillers include zinc oxide, zinc sulfate, barium carbonate, barium sulfate, calcium oxide, calcium carbonate, clay, tungsten, tungsten carbide, silica, and mixtures thereof. Rubber regrind (recycled core material) and polymeric, ceramic, metal, and glass microspheres also may be used. Generally, the additives will be present in the composition in an amount between about 1 and about 70 weight percent based on total weight of the composition depending upon the desired properties.

Intermediate Layers

In one preferred embodiment, an intermediate layer is disposed between the single or multi-layered core and surrounding cover layer. These intermediate layers also can be referred to as casing or mantle or inner cover layers. The intermediate layer can be formed from any materials known in the art, including thermoplastic and thermosetting materials, but preferably is formed of an ionomer composition comprising an ethylene acid copolymer containing acid groups that are at least partially neutralized. Suitable ethylene acid copolymers that may be used to form the intermediate layers are generally referred to as copolymers of ethylene; $C_3$ to $C_8$ α,β-ethylenically unsaturated mono- or dicarboxylic acid; and optional softening monomer. These ethylene acid copolymer ionomers also can be used to form the inner core and outer core layers as described above. In other embodiments, these thermoplastic ionomer compositions can be used to make the golf ball cover.

Suitable ionomer compositions include partially-neutralized ionomers and highly-neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers. For purposes of the present disclosure, "HNP" refers to an acid copolymer after at least 70% of all acid groups present in the composition are neutralized. Preferred ionomers are salts of O/X- and O/X/Y-type acid copolymers, wherein O is an α-olefin, X is a $C_3$-$C_8$ α,β-ethylenically unsaturated carboxylic acid, and Y is a softening monomer. O is preferably selected from ethylene and propylene. X is preferably selected from methacrylic acid, acrylic acid, ethacrylic acid, crotonic acid, and itaconic acid. Methacrylic acid and acrylic acid are particularly preferred. Y is preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate.

Preferred O/X and O/X/Y-type copolymers include, without limitation, ethylene acid copolymers, such as ethylene/(meth)acrylic acid, ethylene/(meth)acrylic acid/maleic anhydride, ethylene/(meth)acrylic acid/maleic acid mono-ester, ethylene/maleic acid, ethylene/maleic acid mono-ester, ethylene/(meth)acrylic acid/n-butyl (meth)acrylate, ethylene/(meth)acrylic acid/isobutyl (meth)acrylate, ethylene/(meth)acrylic acid/methyl (meth)acrylate, ethylene/(meth)acrylic acid/ethyl (meth)acrylate terpolymers, and the like. The term, "copolymer," as used herein, includes polymers having two types of monomers, those having three types of monomers, and those having more than three types of monomers. Preferred α,β-ethylenically unsaturated mono- or dicarboxylic acids are (meth) acrylic acid, ethacrylic acid, maleic acid, crotonic acid, fumaric acid, itaconic acid. (Meth) acrylic acid is most preferred. As used herein, "(meth) acrylic acid" means methacrylic acid and/or acrylic acid. Likewise, "(meth) acrylate" means methacrylate and/or acrylate.

In a particularly preferred version, highly neutralized E/X- and E/X/Y-type acid copolymers, wherein E is ethylene, X is a $C_3$-$C_8$ α,β-ethylenically unsaturated carboxylic acid, and Y is a softening monomer are used. X is preferably selected from methacrylic acid, acrylic acid, ethacrylic acid, crotonic acid, and itaconic acid. Methacrylic acid and acrylic acid are particularly preferred. Y is preferably an acrylate selected from alkyl acrylates and aryl acrylates and preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate. Preferred E/X/Y-type copolymers are those wherein X is (meth) acrylic acid and/or Y is selected from (meth) acrylate, n-butyl (meth) acrylate, isobutyl (meth) acrylate, methyl (meth) acrylate, and ethyl (meth) acrylate. More preferred E/X/Y-type copolymers are ethylene/(meth) acrylic acid/n-butyl acrylate, ethylene/(meth) acrylic acid/methyl acrylate, and ethylene/(meth) acrylic acid/ethyl acrylate.

The amount of ethylene in the acid copolymer is typically at least 15 wt. %, preferably at least 25 wt. %, more preferably least 40 wt. %, and even more preferably at least 60 wt. %, based on total weight of the copolymer. The amount of $C_3$ to $C_8$ α,β-ethylenically unsaturated mono- or dicarboxylic acid in the acid copolymer is typically from 1 wt. % to 35 wt. %, preferably from 5 wt. % to 30 wt. %, more preferably from 5 wt. % to 25 wt. %, and even more preferably from 10 wt. % to 20 wt. %, based on total weight of the copolymer. The amount of optional softening comonomer in the acid copolymer is typically from 0 wt. % to 50 wt. %, preferably from 5 wt. % to 40 wt. %, more preferably from 10 wt. % to 35 wt. %, and even more preferably from 20 wt. % to 30 wt. %, based on total weight of the copolymer. "Low acid" and "high acid" ionomeric polymers, as well as blends of such ionomers, may be used. In general, low acid ionomers are considered to be those containing 16 wt. % or less of acid moieties, whereas high acid ionomers are considered to be those containing greater than 16 wt. % of acid moieties.

The various O/X, E/X, O/X/Y, and E/X/Y-type copolymers are at least partially neutralized with a cation source, optionally in the presence of a high molecular weight organic acid, such as those disclosed in U.S. Pat. No. 6,756,436, the entire disclosure of which is hereby incorporated herein by reference. The acid copolymer can be reacted with the optional high molecular weight organic acid and the cation source simultaneously, or prior to the addition of the cation source. Suitable cation sources include, but are not limited to, metal ion sources, such as compounds of alkali metals, alkaline earth metals, transition metals, and rare earth elements; ammonium salts and monoamine salts; and combinations thereof. Preferred cation sources are compounds of magnesium, sodium, potassium, cesium, calcium, barium, manganese, copper, zinc, lead, tin, aluminum, nickel, chromium, lithium, and rare earth metals.

Other suitable thermoplastic polymers that may be used to form the intermediate layer include, but are not limited to, the following polymers (including homopolymers, copolymers, and derivatives thereof: (a) polyester, particularly those modified with a compatibilizing group such as sulfonate or phosphonate, including modified poly(ethylene terephthalate), modified poly(butylene terephthalate), modified poly(propylene terephthalate), modified poly(trimethylene terephthalate), modified poly(ethylene naphthenate), and those disclosed in U.S. Pat. Nos. 6,353,050, 6,274,298, and 6,001,930, the entire disclosures of which are hereby incorporated herein by reference, and blends of two or more thereof; (b) polyamides, polyamide-ethers, and polyamide-esters, and those disclosed in U.S. Pat. Nos. 6,187,864, 6,001,930, and 5,981,654, the entire disclosures of which are hereby incorporated herein by reference, and blends of two or more thereof; (c) polyurethanes, polyureas, polyurethane-polyurea hybrids, and blends of two or more thereof; (d) fluoropolymers, such as those disclosed in U.S. Pat. Nos. 5,691,066, 6,747,110 and 7,009,002, the entire disclosures of which are hereby incorporated herein by reference, and blends of two or more thereof; (e) polystyrenes, such as poly(styrene-co-maleic anhydride), acrylonitrile-butadiene-styrene, poly(styrene sulfonate), polyethylene styrene, and blends of two or more thereof; (f) polyvinyl chlorides and grafted polyvinyl chlorides, and blends of two or more thereof; (g) polycarbonates, blends of polycarbonate/acrylonitrile-butadiene-styrene, blends of polycarbonate/polyurethane, blends of polycarbonate/polyester, and blends of two or more thereof; (h) polyethers, such as polyarylene ethers, polyphenylene oxides, block copolymers of alkenyl aromatics with vinyl aromatics and polyamicesters, and blends of two or more thereof; (i) polyimides, polyetherketones, polyamideimides, and blends of two or more thereof; and (j) polycarbonate/polyester copolymers and blends.

Golf Ball Construction

The solid cores for the golf balls of this invention may be made using any suitable conventional technique such as, for example, compression or injection-molding. Typically, the cores are formed by compression molding a slug of uncured or lightly cured rubber material into a spherical structure. Prior to forming the cover layer, the core structure may be surface-treated to increase the adhesion between its outer surface and adjacent layer. Such surface-treatment may include mechanically or chemically-abrading the outer surface of the core. For example, the core may be subjected to corona-discharge, plasma-treatment, silane-dipping, or other treatment methods known to those in the art.

As discussed above, an inner cover layer or intermediate layer, preferably formed from an ethylene acid copolymer ionomer composition, can be formed between the core or ball sub-assembly and cover layer. The intermediate layer comprising the ionomer composition may be formed using a conventional technique such as, for example, compression or injection-molding. For example, the ionomer composition may be injection-molded or placed in a compression mold to produce half-shells. These shells are placed around the core in a compression mold, and the shells fuse together to form an intermediate layer. Alternatively, the ionomer composition is injection-molded directly onto the core using retractable pin injection-molding.

Application of Primer, Top-Coats and Isocyanate Treatments

After the golf balls have been removed from the mold, they may be subjected to finishing steps such as flash-trimming, surface-treatment, marking, and application of coatings in accordance with this invention. For example, in traditional white-colored golf balls, the white-pigmented outer cover layer may be surface-treated using a suitable method such as, for example, corona, plasma, or ultraviolet (UV) light-treatment. In another finishing process, the golf balls are painted with one or more paint coatings. For example, white or clear primer paint may be applied first to the surface of the ball and then indicia may be applied over the primer followed by application of a clear polyurethane top-coat. Indicia such as trademarks, symbols, logos, letters, and the like may be printed on the outer cover or prime-coated layer, or top-coated layer using pad-printing, ink-jet printing, dye-sublimation, or other suitable printing methods. Any of the surface coatings may contain a fluorescent optical brightener.

In one embodiment, a first (primer) polyurethane coating comprising unreacted isocyanate groups and having an isocyanate index of at least about 115 is applied to the outer cover. The golf ball is then preferably treated with heat so the coating is at least partially-cured. For example, the golf ball can be heated preferably to a surface temperature of at least about 105° to about 200° F. Preferably, the golf ball is heated to a surface temperature of about 120° to about 150° F. Preferably, the golf ball is then heated for at a period of 2 minutes to about 240 minutes, more preferably a period of 4 minutes to 120 minutes, and most preferably about 8 minutes to 60 minutes. In a third step, a second (top-coat) polyurethane coating is applied to the outer cover. Any suitable coating technique may be used to apply the first and second polyurethane coatings. For example, spraying, dipping, brushing, or rolling methods can be used. Then the golf ball can go through a series of finishing steps.

In a second embodiment, a first (primer) polyurethane comprising unreacted isocyanate groups and having an isocyanate index of at least about 115 is applied to the outer cover and the golf ball is treated with heat as described above. In a third step, a second (top-coat) polyurethane coating having an isocyanate index of less than 96 is applied to the outer cover.

In a third embodiment, a first (primer) polyurethane comprising unreacted isocyanate groups and having an isocyanate index of at least about 115 and further comprising a catalyst is applied to the outer cover and the golf ball is treated with heat as described above. In a third step, a second (top-coat) polyurethane coating is applied to the outer cover as described above. The thermoplastic polyurethane composition of the outer cover layer and second (top-coat) polyurethane coatings also may comprise catalysts. Suitable catalysts include, for example, dibutyl tin dilaurate, dibutyl tin acetylacetonate, dibutyl tin dibutoxide, dibutyl tin sulphide, dibutyl tin di-2-ethylhexanoate, dibutyl tin (IV) diacetate, dialkyltin (IV) oxide, tributyl tin laurylmercaptate, dibutyl tin dichloride, organo lead, tetrabutyl titanate, tertiary amines, mercaptides, stannous octoate, potassium octoate, zinc octoate, diaza compounds, and potassium acetate, and mixtures thereof.

In a fourth embodiment, a mixture comprising a multi-functional isocyanate and solvent is applied to the outer cover and the golf ball is treated with heat as described above. The mixture also may contain additives such as, for example, ultraviolet (UV) light stabilizers. A first (primer) polyurethane coating that may be over-indexed or under-indexed may be applied to the outer cover. For example, the mixture may be over-indexed and comprise unreacted isocyanate groups and have an isocyanate index of at least about 115. In another example, the mixture may be under indexed and have an isocyanate index of less than 96. The golf ball is treated with heat as described above. A second polyurethane top-coating having an isocyanate index that is over-indexed or under-indexed may be applied. This treatment of the outer cover layer with isocyanates further enhances cross-linking and improve cover durability. These isocyanates can function as cross-linkers in the thermoplastic polyurethane cover. The chain length of the thermoplastic polyurethane is extended and thus the molecular weight of the polyurethane is increased when treated with the multi-functional isocyanates.

Isocyanate Indexing:

In some embodiments, the cross-linking may take place as a result of the relative proportions of isocyanate functional groups in the cover layer and the coating layer. As is generally known, polyurethanes (whether thermoplastic or thermoset) are polymerized through the reaction between an isocyanate functional group on a polyisocyanate and a hydroxyl functional group on a polyol. The relative stoichiometric amounts of each of these functional groups is expressed as the "isocyanate index" of the polyurethane system. Namely, the isocyanate index may be expressed as the ratio of the number of isocyanate groups present in the polyurethane system to the number of hydroxyl groups times 100. Or, in other words, the isocyanate index may be expressed as the ratio of the actual number of isocyanate functional groups present in the polyurethane system to the hypothetical number of isocyanate functional groups necessary to fully react with all of the hydroxyl groups present in the polyurethane system.

The isocyanate index may also be referred to as the "NCO index." The location of the decimal place may vary based on common convention (i.e. the value of the isocyanate index may be equally expressed as 1.00 or 100 depending on colloquialism). As used herein, an isocyanate index value of 100 means that the number of isocyanate functional groups present in the polyurethane system is equal to the number of hydroxyl functional groups present in the polyurethane system. An isocyanate index value of less than 100 means that excess hydroxyl groups are present, and an isocyanate index value of greater than 100 means that excess isocyanate groups are present.

Preferably, the multi-functional isocyanate compound is selected from the group consisting of toluene 2,4-diisocyanate (TDI), toluene 2,6-diisocyanate (TDI), 4,4'-methylene diphenyl diisocyanate (MDI), 2,4'-methylene diphenyl diisocyanate (MDI), polymeric methylene diphenyl diisocyanate (PMDI), p-phenylene diisocyanate (PPDI), m-phenylene diisocyanate (PDI), naphthalene 1,5-diisocynate (NDI), naphthalene 2,4-diisocyanate (NDI), p-xylene diisocyanate (XDI), and isophorone diisocyanate (IPDI), 1,6-hexamethylene diisocyanate (HDI), 4,4'-dicyclohexylmethane diisocyanate ("$H_{12}$ MDI"), meta-tetramethylxylyene diisocyanate (TMXDI), trans-cyclohexane diisocyanate (CHDI), and homopolymers and copolymers and blends thereof. More preferably, the polyisocyanate is selected from the group consisting of of 4,4'-methylene diphenyl diisocyanate (MDI), 2,4'-methylene diphenyl diisocyanate (MDI), toluene 2,4-diisocyanate (TDI), toluene 2,6-diisocyanate (TDI), 4,4'-dicyclohexylmethane diisocyanate ("$H_{12}$ MDI"), p-phenylene diisocyanate (PPDI), and isophorone diisocyanate (IPDI), and homopolymers and copolymers and blends thereof.

Generally, the polyurethane coating material may be a two-part coating system. A preferred coating system includes (1) a first part comprising a polyol or another compound containing an active hydrogen atom, and (2) a second part comprising a polyisocyanate (or polyisocyanurate) with at least two —N=C=O groups. Suitable polyols for the polyurethane coating system include both polyether and polyester polyols. In one particular embodiment, the polyol may be a hydroxyl functional polyol having a hydroxyl equivalent weight in the range of from about 50 to about 1500, or an hydroxyl equivalent weight being in the range of from about 200 to about 800. Suitable polyesters for use herein include poly (oxydiethylene adipates) that are condensation products of diethylene glycol and adipic acid, branched with trimethylolpropane or pentaerythritol, and polycaprolactone (hydroxycaproic acid) polyesters.

The solvent may be any solvent that forms a solution with the multi-functional isocyanate and allows for some level of penetration of the isocyanate into the thermoplastic polyurethane substrate to which it is applied. Suitable solvents include, for example, toluene, xylene, naphthalene, ketones, and acetates. Preferably, the solvent comprises one selected from the group consisting of acetone, methyl ethyl ketone, methyl amyl ketone, dimethyl heptanone, methyl pentanone, methyl isobutyl ketone, cyclohexanone, methyl acetate, ethyl acetate, and butyl acetate, and mixtures thereof. The mixture preferably comprises from about 1 to 25 wt. % isocyanate, and more preferably about 2 to 20 wt. %, and most preferably 5 to 18 wt % isocyanate.

One embodiment of the invention includes a golf ball comprising a single or dual core and a cover layer formed from a thermoplastic polyurethane (TPU), wherein the TPU cover is not treated with an isocyanate-rich composition as described above. In another embodiment, the TPU cover is treated with an isocyanate-rich composition as described above.

Post-treatment of molded golf balls having thermoplastic polyurethane covers with isocyanate-rich and other compositions are described, for example, in Sullivan and Binette, U.S. Pat. Nos. 10,252,113 and 10,363,458 and published U.S. Patent Applications 2019/0083854-A1 and 2019/0217157-A1, all of the disclosures of which are incorporated by reference.

Thickness and Hardness of Golf Balls

The golf balls of this invention provide the ball with a variety of advantageous mechanical and playing performance properties as discussed further below. In general, the hardness, diameter, and thickness of the different ball layers may vary depending upon the desired ball construction. If the ball includes an intermediate layer or inner cover layer, the hardness (material) is about 50 Shore D or greater, more preferably about 55 Shore D or greater, and most preferably about 60 Shore D or greater. In one embodiment, the inner cover has a Shore D hardness of about 62 to about 90 Shore D. In one example, the inner cover has a hardness of about 68 Shore D or greater. In addition, the thickness of the inner cover layer is preferably about 0.015 inches to about 0.100 inches, more preferably about 0.020 inches to about 0.080 inches, and most preferably about 0.030 inches to about 0.050 inches.

The manufacturing methods and molds of this invention may be used to mold relatively thin outer covers, for example covers having a thickness of less than 0.075 inches, more preferably 0.050 inches and below, preferably 0.040 inches and below, more preferably 0.030 inches and below, and most preferably 0.025 inches and below.

More particularly, the outer cover preferably has a thickness within a range having a lower limit of about 0.004 or 0.010 or 0.020 or 0.030 or 0.040 inches and an upper limit of about 0.050 or 0.055 or 0.065 or 0.070 or 0.080 inches. Most preferably, the thickness of the outer cover is about 0.025 inches or less. The outer cover preferably has a surface hardness of 65 Shore D or less, or 55 Shore D or less, or 50 Shore D or less, or 50 Shore D or less, or 45 Shore D or less. Preferably, the outer cover has hardness in the range of about 20 to about 59 Shore D. In one example, the outer cover has hardness in the range of about 25 to about 55 Shore D.

The method of this invention is particularly effective in providing golf balls having a thin outer cover layer. Furthermore, the method of this invention provides thin outer covers with substantially uniform thickness. The resulting balls of this invention have good impact durability and cut/shear-resistance. The United States Golf Association ("USGA") has set total weight limits for golf balls. Particularly, the USGA has established a maximum weight of 45.93 g (1.62 ounces) for golf balls. There is no lower weight limit. In addition, the USGA requires that golf balls used in competition have a diameter of at least 1.68 inches. There is no upper limit so many golf balls have an overall diameter falling within the range of about 1.68 to about 1.80 inches. The golf ball diameter is preferably about 1.68 to 1.74 inches, more preferably about 1.68 to 1.70 inches. In accordance with the present invention, the weight, diameter, and thickness of the core and cover layers may be adjusted, as needed, so the ball meets USGA specifications of a maximum weight of 1.62 ounces and a minimum diameter of at least 1.68 inches.

Preferably, the golf ball has a Coefficient of Restitution (COR) of at least 0.750 and more preferably at least 0.800 (as measured per the test methods below.) The core of the golf ball generally has a compression in the range of about 30 to about 130 and more preferably in the range of about 70 to about 110 (as measured per the test methods below.) These properties allow players to generate greater ball velocity off the tee and achieve greater distance with their drives.

At the same time, the relatively thin outer cover layer means that a player will have a more comfortable and natural feeling when striking the ball with a club. The ball is more playable and its flight path can be controlled more easily. This control allows the player to make better approach shots near the green. Furthermore, the outer covers of this invention have good impact durability and mechanical strength.

The finished golf ball can have dimples of various shapes and be arranged in various patterns to modify the aerodynamic properties of the ball. As discussed above, the polymeric cover material conforms to the interior geometry of the mold cavities to form a dimple pattern on the surface of the ball. The mold cavities may have any suitable dimple arrangement such as, for example, icosahedral, octahedral, cube-octahedral, dipyramid, and the like. In addition, the dimples may be circular, oval, triangular, square, pentagonal, hexagonal, heptagonal, octagonal, and the like. Possible cross-sectional shapes include, but are not limited to, circular arc, truncated cone, flattened trapezoid, and profiles defined by a parabolic curve, ellipse, semi-spherical curve, saucer-shaped curve, sine or catenary curve, or conical curve. Other possible dimple designs include dimples within dimples, constant depth dimples, or multi-lobe dimples. It also should be understood that more than one shape or type of dimple may be used on a single ball, if desired. The total number of dimples on the ball, or dimple count, may vary depending such factors as the sizes of the dimples and the pattern selected. Dimple patterns that provide a high percentage of surface coverage are preferred.

A two-piece golf ball can be made having a core and a surrounding thermoplastic polyurethane outer cover layer. In this golf ball, the core has a relatively large diameter and the outer cover has a relatively small thickness. In another embodiment, a two-piece golf ball having a smaller core and a thicker outer cover layer can be made. A three-piece golf ball can be made, wherein the dual-layered core (inner core and outer core layer) is surrounded by a single-layered thermoplastic polyurethane cover formed about the dual-layered core using a method of molding and mold of the invention.

Finally, a four-piece ball containing a dual-core having an inner core and outer core layer can be made for example. The dual-core is surrounded by a multi-layered cover with an inner cover layer and thermoplastic polyurethane outer cover.

It should be understood that the subject matter shown in FIGS. 1-5 herein is for illustrative purposes only and not meant to be restrictive. Other mold and golf ball constructions can be made in accordance with this invention.

When numerical lower limits and numerical upper limits are set forth herein, it is contemplated that any combination of these values may be used. Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention.

It is understood that the manufacturing methods, mold apparatus, compositions, constructions, and products described and illustrated herein represent only some embodiments of the invention. It is appreciated by those skilled in the art that various changes and additions can be made to methods, mold apparatus, compositions, constructions, and products without departing from the spirit and scope of this invention. It is intended that all such embodiments be covered by the appended claims.

What is claimed is:

1. A method of molding a golf ball, comprising the steps of:

providing a mold having an upper mold cavity and a lower mold cavity;
wherein each mold cavity has an arcuate inner surface defining an inverted dimple and fret pattern; and the upper mold cavity and a lower mold cavity collectively create a mold having an interior spherical cavity for holding a golf ball subassembly when mated together to provide a mated mold;
wherein the mated mold has a wave-shaped parting line that extends circumferentially about the mold at an interface between the upper mold cavity and the lower mold cavity; and
wherein the wave-shaped parting line contacts fret portions of the inverted dimple and fret pattern without contacting any dimple portion of the inverted dimple and fret pattern; and
wherein the mold has a plurality of injection gates that are spaced circumferentially about the mold within the wave-shaped parting line at an interface between the upper mold cavity and the lower mold cavity without intersecting any dimple of the dimple and fret pattern;
wherein the dimple and fret patterns of the upper mold cavity and the lower mold cavity each includes at least a plurality of first dimples adjacent the wave-shaped parting line and a plurality of second dimples adjacent the wave-shaped parting line, wherein the first dimples are smaller than the second dimples;
wherein each injection gate has a center that is located at an intersection of the wave-shaped parting line and a phantom equator that extends circumferentially about the mold;
wherein each injection gate is made up of a first portion in the upper mold cavity and a second portion in the lower mold cavity; and wherein at least one injection gate includes a first portion positioned directly between the wave-shaped parting line and a first dimple in the dimple and fret pattern of the upper mold cavity, and at least one injection gate includes a second portion positioned directly between the wave-shaped parting line and a first dimple in the dimple and fret pattern of the lower mold cavity;

loading the golf ball subassembly into the interior spherical cavity of the mold;

securing the subassembly within the mold using a plurality of retractable pins;

injecting a polymeric material into the spherical cavity to mold a cover layer about the golf ball sub-assembly within the mold and form a molded golf ball;

withdrawing the retractable pins before molding is finished; and separating the upper mold cavity and lower mold cavity and removing the molded golf ball from the mold.

2. The method of molding a golf ball of claim 1, wherein the wave-shaped parting line has a maximum amplitude of 0.100 inches that is created about the phantom equator and containing a plurality of midpoints between perimeters of opposing dimples at the interface between the upper mold cavity and the lower mold cavity.

3. The method of molding a golf ball of claim 2, wherein the maximum amplitude is less than 0.100 inches.

4. The method of molding a golf ball of claim 2, wherein the maximum amplitude is from about 0.015 inches to about 0.030 inches.

5. The method of molding a golf ball of claim 1, wherein the injection gates are equi-spaced.

6. The method of molding a golf ball of claim 1, wherein each injection gate is a minimum distance of 0.001 inches to about 0.010 inches from any portion of any dimple.

7. The method of molding a golf ball of claim 1, wherein each injection gate of the plurality of injection gates is oblong-shaped.

8. The method of molding a golf ball of claim 1, wherein at least some of the injection gates are teardrop-shaped.

9. The method of molding a golf ball of claim 1, wherein the mold comprises at least 16 injection gates.

10. The method of molding a golf ball of claim 1, wherein injection gates of the plurality of injection gates are sized, contoured and spaced within the wave-shaped parting line such that the injection gates do not contact dimples during injection gate buffing and/or deflashing and/or when removing the molded golf ball from the mold.

11. The method of molding a golf ball of claim 1, wherein the mold further comprises a plurality of cold slug wells, each being disposed entirely inside the mold cavity between consecutive injection gates and each being sized, shaped and contoured to receive polymer that cools within a runner of the mold while progressing toward the injection gate; wherein each cold slug well extends perpendicular to each runner and radially inward toward a center of the golf ball subassembly secured within the mold, with adjacent injection gates also extending radially inward toward a center of the subassembly.

* * * * *